United States Patent
Venkata

(10) Patent No.: US 9,843,994 B2
(45) Date of Patent: Dec. 12, 2017

(54) SYSTEMS AND METHODS FOR SEARCHING FOR RADIO ACCESS TECHNOLOGIES

(71) Applicant: QUALCOMM Incorporated, San Diego, CA (US)

(72) Inventor: Madhusudan K. Venkata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/718,079

(22) Filed: Dec. 18, 2012

(65) Prior Publication Data

US 2014/0171071 A1    Jun. 19, 2014

(51) Int. Cl.
| | | |
|---|---|---|
| H04W 4/00 | (2009.01) |
| H04W 48/18 | (2009.01) |
| H04W 60/00 | (2009.01) |
| H04W 88/06 | (2009.01) |
| H04W 48/04 | (2009.01) |
| H04W 4/12 | (2009.01) |
| H04W 60/04 | (2009.01) |
| H04W 48/16 | (2009.01) |

(52) U.S. Cl.
CPC ............ *H04W 48/18* (2013.01); *H04W 4/12* (2013.01); *H04W 48/04* (2013.01); *H04W 48/16* (2013.01); *H04W 60/00* (2013.01); *H04W 60/04* (2013.01); *H04W 88/06* (2013.01)

(58) Field of Classification Search
CPC ....... H04W 4/12; H04W 88/06; H04W 48/16; H04W 48/18; H04W 48/04; H04W 60/00; H04W 60/006; H04W 60/04

USPC .................. 455/434, 435.1, 435.2
See application file for complete search history.

(56) References Cited

U.S. PATENT DOCUMENTS

| | | | |
|---|---|---|---|
| 8,843,123 B1 * | 9/2014 | Perets et al. ................. 455/418 |
| 2005/0233700 A1 * | 10/2005 | Pecen et al. ............... 455/67.11 |
| 2007/0183383 A1 * | 8/2007 | Bitran et al. ................. 370/338 |
| 2008/0108346 A1 * | 5/2008 | Umatt et al. .............. 455/432.1 |
| 2008/0220784 A1 * | 9/2008 | Somasundaram et al. ... 455/437 |

(Continued)

FOREIGN PATENT DOCUMENTS

| | | |
|---|---|---|
| JP | 2010081437 A | 4/2010 |
| JP | 2012195625 A | 10/2012 |

(Continued)

OTHER PUBLICATIONS

International Search Report and Written Opinion—PCT/US2012/070493—ISA/EPO—dated Oct. 17, 2013.

(Continued)

*Primary Examiner* — Charles Appiah
*Assistant Examiner* — Jaime Holliday
(74) *Attorney, Agent, or Firm* — Austin Rapp & Hardman, P.C

(57) ABSTRACT

A method for searching for radio access technologies by a wireless communication device is described. The method includes initiating a search for one or more radio access technologies. The method also includes determining if the wireless communication device has low mobility. The method also includes suspending the search when a first event occurs. The method also includes storing the search results. The method further includes resuming the search based on the search results when a second event occurs.

17 Claims, 10 Drawing Sheets

(56) References Cited

U.S. PATENT DOCUMENTS

| | | | |
|---|---|---|---|
| 2009/0088154 A1 | 4/2009 | Umatt et al. | |
| 2009/0131081 A1* | 5/2009 | Abdel-Kader | H04W 48/16 |
| | | | 455/456.6 |
| 2009/0164813 A1* | 6/2009 | Tu | H04B 1/1615 |
| | | | 713/320 |
| 2009/0185524 A1 | 7/2009 | Sammour et al. | |
| 2010/0002611 A1* | 1/2010 | Umatt et al. | 370/311 |
| 2011/0014334 A1 | 1/2011 | Regiroli | |
| 2011/0124334 A1* | 5/2011 | Brisebois et al. | 455/434 |
| 2012/0190361 A1 | 7/2012 | Shaikh et al. | |
| 2013/0084856 A1* | 4/2013 | Prasad et al. | 455/434 |

FOREIGN PATENT DOCUMENTS

| | | |
|---|---|---|
| WO | 2008058045 A2 | 5/2008 |
| WO | WO-2008052123 A1 | 5/2008 |
| WO | WO-2011041662 A1 | 4/2011 |

OTHER PUBLICATIONS

LTE; Evolved Universal Terrestrial Radio Access Network (E-UTRAN); Improved network controlled mobility between E-UTRAN and 3GPP2/mobile WiMAX radio technologies (3GPP TR 36.938 Version 9.0.0 Release 9), Technical Report, European Telecommunications Standards Institute (ETSI), 650, Route Des Lucioles ; F-06921 Sophia-Antipolis ; France vol. 3GPP RAN 2, No. V9.0.0 Feb. 1, 2010 (Feb. 1, 2010), XP014046303, the whole document.

* cited by examiner

SYSTEMS AND METHODS FOR SEARCHING FOR RADIO ACCESS TECHNOLOGIES

TECHNICAL FIELD

The present disclosure relates generally to communication systems. More specifically, the present disclosure relates to systems and methods for searching for radio access technologies.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.). Some communication devices (e.g., access terminals, laptop computers, smart phones, media players, gaming devices, etc.) may wirelessly communicate with other communication devices.

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices.

As wireless communication devices have become more widely deployed, the number of radio access technologies available has also increased. However, inefficiencies may arise when searching for radio access technologies. Accordingly, systems and methods that may help to reduce these inefficiencies may be beneficial.

SUMMARY

A method for searching for radio access technologies by a wireless communication device is described. The method includes initiating a search for one or more radio access technologies. The method also includes determining if the wireless communication device has low mobility. The method further includes suspending the search when a first event occurs. The method additionally includes storing search results. The method also includes resuming the search based on the search results when a second event occurs.

The first event may be a change of a wireless communication device connection state. The first event may be a determination that the wireless communication device has low mobility. The second event may be a change of the wireless communication device connection state. The second event may be a determination that connected discontinuous reception is configured and active. The second event may be a release of a radio resource control connection.

The method may include determining a wireless communication device connection state. The method may include stopping the search when a third event occurs. The method may also include outputting the search results. The third event may be an expiration of a time interval. The third event may be a determination of high or medium wireless communication device mobility.

The method may include determining if a connection has been requested. The method may also include continuing the search when a connection has not been requested.

A wireless communication device for searching for radio access technologies is described. The wireless communication device includes search circuitry that initiates a search for one or more radio access technologies. The wireless communication device also includes mobility determination circuitry coupled to the search circuitry. The mobility determination circuitry determines if the wireless communication device has low mobility. The wireless communication device also includes event detection circuitry coupled to the mobility determination circuitry. The event detection circuitry suspends the search when a first event occurs and resumes the search based on search results when a second event occurs. The wireless communication device further includes memory coupled to the search circuitry. The memory stores the search results.

A computer-program product for searching for radio access technologies is described. The computer-program product includes a non-transitory tangible computer-readable medium having instructions thereon. The instructions include code for causing a wireless communication device to initiate a search for one or more radio access technologies. The instructions also include code for causing the wireless communication device to determine if the wireless communication device has low mobility. The instructions further include code for causing the wireless communication device to suspend the search when a first event occurs. The instructions additionally include code for causing the wireless communication device to store search results. The instructions further include code for causing the wireless communication device to resume the search based on the search results when a second event occurs.

An apparatus for searching for radio access technologies is also described. The apparatus includes means for initiating a search for one or more radio access technologies. The apparatus also includes means for determining if the apparatus has low mobility. The apparatus further includes means for suspending the search when a first event occurs. The apparatus additionally includes means for storing search results. The apparatus also includes means for resuming the search based on the search results when a second event occurs.

DETAILED DESCRIPTION

Figure 1:
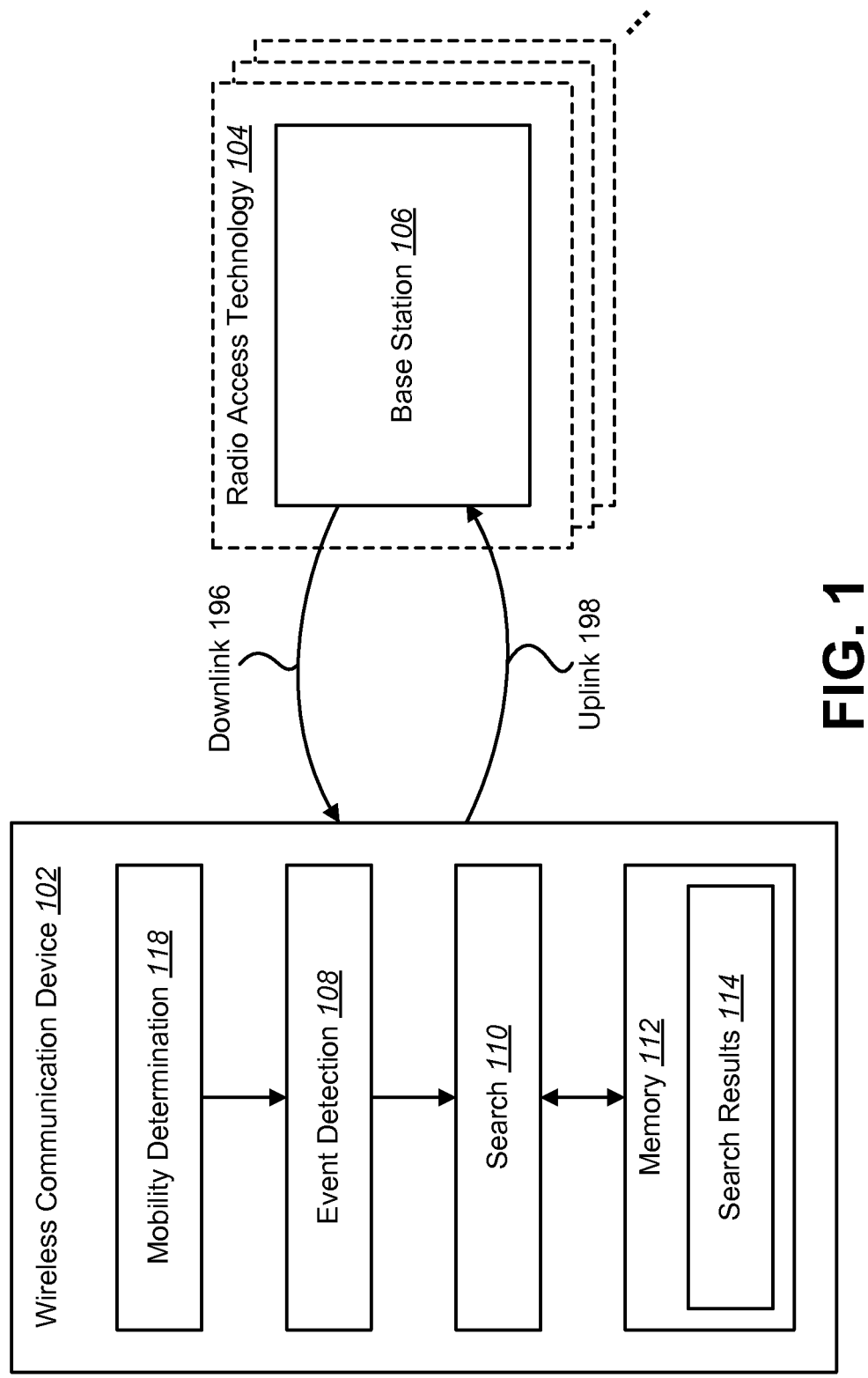
FIG. 1 is a block diagram illustrating one configuration of a wireless communication device and one or more radio access technologies in which systems and methods for searching for radio access technologies may be implemented.

Examples of communication devices include cellular telephone base stations or nodes, access points, wireless gateways and wireless routers. A communication device may operate in accordance with certain industry standards, such as Third Generation Partnership Project (3GPP) Long Term Evolution (LTE) standards. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standards, CDMA 2000 1× standards, Evolution-Data Optimized (EVDO) standards, Interim Standard 95 (IS-95), evolved High Rate Packet Data (eHRPD) radio standards and others. In some standards, a communication device may be referred to as a Node B, evolved Node B, etc. While some of the systems and methods disclosed herein may be described in terms of one or more standards, this should not limit the scope of the disclosure, as the systems and methods may be applicable to many systems and/or standards.

The 3rd Generation Partnership Project (3GPP) is a collaboration between groups of telecommunications associations that aims to define a globally applicable 3rd generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipment (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment, remote terminal, access point, base station, Node B, evolved Node B, etc.).

Some communication devices may be capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

Searching has become more complex as a user equipment searches multiple radio access technologies (e.g., RATs) within a limited span of time. Because Long Term Evolution (LTE) is a data-centric technology and may run on wireless communication devices on which applications may be data hungry (e.g., a user equipment is in a connected state for a majority of the time), searches in Long Term Evolution (LTE) may be optimized to deliver results to the user.

As used herein, the term "search" denotes an operation to discover the presence of one or more radio access technologies. For example, a search may include scanning one or more frequency bands in an attempt to discover the presence of one or more radio access technologies. For instance, searching may include attempting to receive a beacon or signal in one or more frequency bands that indicates the presence of a radio access technology. Additionally or alternatively, searching may include sending a signal on one or more frequency bands in order to prompt a response that indicates the presence of a radio access technology.

Some configurations of the systems and methods disclosed herein may describe a method for searching in Long Term Evolution (LTE). In one configuration, a user equipment may be able to suspend/resume the search across connection cycles. The user equipment may also be able to perform searches during a Long Term Evolution (LTE) connected state if connected discontinuous reception (C-DRX) is configured and active. The user equipment may also be able to determine the mobility state and take appropriate action. For example, in low mobility scenarios and when connected discontinuous reception is configured, the wireless communication device may suspend and/or resume the search without a radio resource control (RRC) state change. In other words, when a wireless communication device is in a connected state and connected discontinuous reception is configured and active, the wireless communication device may suspend the search in non-gap periods and resume the search in gap periods.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. Features and/or elements depicted in a Figure may be combined with one or more features and/or elements depicted in one or more other Figures.

FIG. 1 is a block diagram illustrating one configuration of a wireless communication device 102 and one or more radio access technologies 104 (e.g., RATs) in which systems and methods for searching for radio access technologies 104 may be implemented. A base station 106 is a device that may communicate with one or more wireless communication devices 102. A base station 106 may also be referred to as, and may include some or all of the functionality of, an access point, a broadcast transmitter, a NodeB, an evolved NodeB, etc. Each base station 106 may provide communication coverage for a particular geographic area. A base station 106 may provide communication coverage for one or more wireless communication devices 102. The term "cell" may refer to a base station 106 and/or its coverage area depending on the context in which the term is used. Examples of the base station 106 include cellular phone base stations, access points etc.

The wireless communication device 102 may also be referred to as, and may include some or all of the functionality of, a terminal, an access terminal, a subscriber unit, a station, a user equipment, etc. Examples of the wireless communication device 102 may include a cellular phone, a personal digital assistant (PDA), a wireless device, a wireless modem, a handheld device, a laptop computer, a Session Initiation Protocol (SIP) phone, a wireless local loop (WLL) station, etc.

A wireless communication device 102 may communicate with one or more base stations 106 on a downlink 196 and/or an uplink 198 at any given moment. The downlink 196 (or forward link) refers to the communication link from a base station 106 to a wireless communication device 102, and the uplink 198 (or reverse link) refers to the communication link from a wireless communication device 102 to a base station 106.

A wireless communication device 102 may be capable of communicating with the one or more base stations 106 as part of one or more radio access technologies 104. Examples of radio access technologies 104 include Global System for Mobile Communications (GSM), 1× (also known as cdma2000 1×), high data rate (HDR), Wideband Code Division Multiple Access (W-CDMA) and Long Term Evolution (LTE). One or more of the radio access technologies 104 may be of different types. For example, a first radio access technology 104 may include a Global System for Mobile Communications (GSM) network. In this example, a second radio access technology 104 may include a Long Term Evolution (LTE) network.

Communications between the wireless communication device 102 and base station 106 may be achieved through transmissions over a wireless link. Such a communication link may be established via a single-input and single-output (SISO), multiple-input and single-output (MISO) or a multiple-input and multiple-output (MIMO) system. A multiple-input and multiple-output system includes transmitter(s) and receiver(s) equipped, respectively, with multiple ($N_T$) transmit antennas and multiple ($N_R$) receive antennas for data transmission. Single-input and single-output and multiple-input and single-output systems are particular instances of a multiple-input and multiple-output system. The multiple-input and multiple-output system can provide improved performance (e.g., higher throughput, greater capacity or improved reliability) if the additional dimensionalities created by the multiple transmit and receive antennas are utilized.

The wireless communication device 102 may include an event detection block/module 108, a search block/module 110 and/or memory 112. Optionally, the wireless communication device 102 may include a mobility determination block/module 118. As used herein, the term "block/module" may indicate that a particular element may be implemented in hardware, software, firmware or a combination thereof. For example, the event detection block/module 108 may be implemented in circuitry, software or a combination of both. It should also be noted that one or more of the elements illustrated in FIG. 1 may be implemented in circuitry (e.g., integrated circuitry) in some configurations.

The search block/module 110 may initiate a search for one or more radio access technologies 104. Examples of radio access technologies include, but are not limited to 1×, Global System for Mobile Communications (GSM), Wideband Code Division Multiple Access (W-CDMA) and Long Term Evolution (LTE) networks. In some implementations, the search block/module 110 may search for more than home base stations (e.g., HeNBs). For example, the search block/module 110 may search for all public land mobile networks (PLMNs) (that the wireless communication device 102 is capable of communicating with, for example). The search block/module 110 may initiate or trigger the search. In some configurations, the search may be an automatic search (e.g., a better system reselection (BSR) scan, acquisition scan, off-frequency scan, silent redial scan, cell reselection, etc.). Alternatively, the search may be a manual search (e.g., based on user input). For example, a user may direct the search block/module 110 to initiate a search via a display (e.g., by pushing a button).

In some implementations, the search block/module 110 may initiate a search based on Long Term Evolution (LTE). For example, the search block/module 110 may initiate a search based on one or more Long Term Evolution (LTE) connection states (e.g., idle or connected). In some implementations, the search may not be based on Wideband Code Division Multiple Access (W-CDMA). More specifically, the search may not be based on one or more Wideband Code Division Multiple Access (W-CDMA) connection states (e.g., CELL-PCH, URA_PCH, CELL_FACH and CELL-_DCH). Similarly, the search may not be based on Universal Mobile Telecommunications System (UMTS). More specifically, the search may not be based on one or more Universal Mobile Telecommunications System (UMTS) connection states (e.g., OOS state).

In some configurations, the search block/module 110 may optionally output the search results 114. The results may be output upon suspending or stopping a search. For example, if a time interval has expired, the search block/module 110 may be directed to stop a search. In some configurations, the search block/module 110 may output the results of the search. For example, the search block/module 110 may be coupled to a display (not shown). In this configuration, the search block/module 110 may send the search results 114 to the display to be presented to a user. In some examples, the wireless communication device 102 may receive an indication (e.g., via user input) to connect to a particular radio access technology 104. The wireless communication device 102 may switch radio access technologies 104 based on the received indication. Alternatively, the wireless communication device 102 may automatically perform an operation based on the search results 114. For example, the wireless communication device 102 may automatically connect to or camp on one or more of the radio access technologies 104 indicated by the search results 114. Additionally or alternatively, the wireless communication device 102 may disconnect from another radio access technology 104 based on the search results 114. For example, the wireless communication device 102 may switch from a 1× network to an LTE network. In another example, the wireless communication device 102 may connect to a Wi-Fi network in addition to an LTE network.

As described above, the wireless communication device 102 may optionally include a mobility determination block/module 118. The mobility determination block/module 118 may determine the wireless communication device 102 mobility. More specifically, the mobility determination block/module 118 may determine whether the wireless communication device 102 has high, medium or low mobility. In some configurations, the term "mobility" may refer to the rate of change of a wireless communication device 102 location. For example, a wireless communication device 102 that has a high rate of change may have high mobility, while a wireless communication device 102 that has a low rate of change may have low mobility. The term "low" as used to describe mobility may indicate a threshold range of mobility that is lower than a "medium" threshold range. Similarly, the term "medium" as used to describe mobility may indicate a threshold range of mobility that is greater than a "low" mobility and less than a "high" mobility. The term "high" as used to describe mobility may indicate a threshold range of mobility that is greater than a "low" mobility and a "medium" mobility. In some implementations, low mobility as described herein may correspond to (e.g., may be) normal mobility in accordance with 3GPP specifications. If the wireless communication device 102 has low mobility, the mobility determination block/module 118 may notify the event detection block/module 108 that the mobility is low. As will be described in greater detail below, the event detection block/module 108 may then direct the search block/module 110 to suspend the search. If the mobility determination block/module 118 indicates to the event detection block/module 108 that the wireless communication device 102 has high or medium mobility, the event detection block/module 408 may direct the search block/module 110 to stop the search.

An event detection block/module 108 may be coupled to the search block/module 110. In some configurations, the event detection block/module 108 may detect one or more events. Based on the one or more events, the event detection block/module 108 may direct the search block/module 110 to suspend the search. In other words, if the event detection block/module 108 detects a first event, the event detection block/module 108 may direct the search block/module 110 to suspend the search. For example, if the event detection block/module 108 detects a change in the connection state (e.g., from an idle radio resource control (RRC) state to a connected radio resource control state), the event detection block/module 108 may direct the search block/module 110 to suspend the search. In another example, if the wireless communication device 102 has low mobility, the event detection block/module 108 may direct the search block/module 110 to suspend the search. In some implementations, the event detection block/module 108 may direct the search block/module 110 to suspend the search without user input. For example, the event detection block/module 108 may direct the search block/module 110 to suspend the search independent of any user input.

Based on the one or more events, the event detection block/module 108 may direct the search block/module 110 to resume the search. In other words, if the event detection block/module 108 detects a second event, the event detection block/module 108 may direct the search block/module 110 to resume the search. For example, if the event detection block/module 108 detects a change in the connection state (e.g., from a connected radio resource control state to an idle radio resource control state), the event detection block/module 108 may direct the search block/module 110 to resume the search. In some configurations, the connection state may change when a radio resource control connection is released.

In some configurations, the event detection block/module 108 may direct the search block/module 110 to resume the search when the wireless communication device 102 is in a connected state (e.g., in a connected radio resource control state). An example is given as follows. In this example, the wireless communication device 102 may be in a connected state. The event detection block/module 108 may determine whether connected discontinuous reception is configured and active. If connected discontinuous reception is configured and active, the event detection block/module 108 may direct the search block/module 110 to resume the search during gaps when the wireless communication device 102 is in a sleep mode during connected discontinuous reception.

In some configurations, the event detection block/module 108 may direct the search block/module 110 to resume the search when the wireless communication device 102 is in an idle state (e.g., in an idle radio resource control state). For example, the wireless communication device 102 may attempt to connect to a radio access technology 104 (e.g., a radio resource control connection). In the event the wireless communication device 102 cannot establish a connection, and remains in an idle state (e.g., an idle radio resource control state), the event detection block/module 108 may direct the search block/module 110 to resume the search.

In some implementations, the event detection block/module 108 may direct the search block/module 110 to resume the search based on the search results 114. For example, when given direction by the event detection block/module 108 to resume a search, the search block/module 110 may obtain the search results 114 (e.g., results that were obtained up to a first event), and resume the search from that point.

Based on the one or more events, the event detection block/module 108 may direct the search block/module 110 to stop the search. In other words, if the event detection block/module 108 detects a third event, the event detection block/module 108 may direct the search block/module 110 to stop the search. For example, if the event detection block/module 108 detects high or medium wireless communication device 102 mobility, the event detection block/module 108 may direct the search block/module 110 to stop the search.

In some implementations, the event detection block/module 108 may direct the search block/module 110 to stop the search at the expiration of a time interval. For example, a time interval may start at the initiation of the search. In this example, the event detection block/module 108 may direct the search block/module 110 to stop the search at the expiration of the time interval.

In some implementations, the event detection block/module 108 may direct the search block/module 110 to stop the search when the search is completed. For example, the search may include searching for one or more bands corresponding to one or more radio access technologies 104. After searching for the one or more bands, the event detection block/module 108 may direct the search block/module 110 to stop the search. In some implementations, the search may be completed before the expiration of the time interval.

Memory 112 coupled to the search block/module 110 may store the search results 114. For example, the memory 112 may store information corresponding to one or more detected radio access technologies 104 discovered during a search conducted by the search block/module 110. In some configurations, the memory 112 may store the search results 114 when a search has been suspended. For example, once the event detection block/module 108 has directed the search block/module 110 to suspend a search, the search block/module 110 may provide the memory 112 with information corresponding to one or more detected radio access technologies 104. The information corresponding to the detected radio access technologies 104 may be stored in the memory 112 as search results 114.

In some implementations, the memory 112 may store the search results 114 when a search has been stopped. For example, once the event detection block/module 108 has directed the search block/module 110 to stop a search, the search block/module 110 may provide the memory 112 with information corresponding to one or more detected radio access technologies 104. The information may be stored in the memory 112 as search results 114. In some configurations, the memory 112 may provide the search results 114 to the search block/module 110 to output the search results 114. As described earlier, the search block/module 110 may output the search results 114 to a display (not shown) to be displayed to a user.

The memory 112 may provide the search results 114 to the search block/module 110 based on a resumption of the search. For example, once the event detection block/module 108 has detected a second event, and directed the search block/module 110 to resume the search, the memory 112 may provide the search block/module 110 with the search results 114. In this example, the search block/module 110 may then resume the search as a continuation of a previously suspended search.

Figure 2:
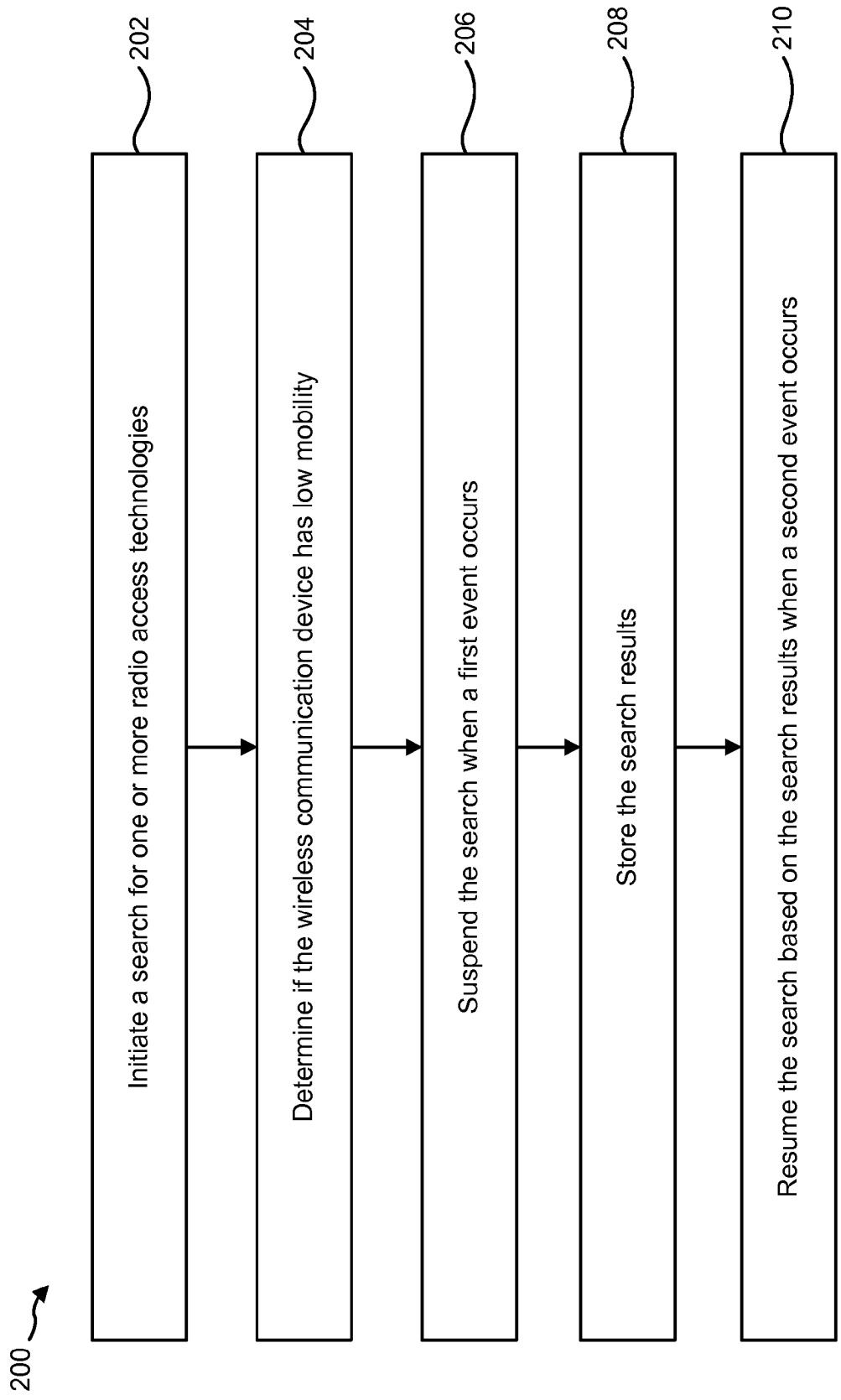
FIG. 2 is a flow diagram illustrating one configuration of a method for searching for radio access technologies.

FIG. 2 is a flow diagram illustrating one configuration of a method 200 for searching for radio access technologies 104. The method 200 may be performed by a wireless communication device 102. The search block/module 110 of the wireless communication device 102 may initiate 202 a search for one or more radio access technologies 104. In some configurations, the wireless communication device 102 may initiate 202 the search based on received input. For example, a user via a display (e.g., a touchscreen on a smartphone) may direct the search block/module 110 to initiate 202 a manual search. In other configurations, the search may be initiated 202 automatically. For example, the search may be initiated 202 as part of an automatic acquisition scan, when the wireless communication device 102 is not in communication with any ratio access technologies 104. In another example, the initiated 202 search may be a better system reselection (BSR) scan, when the wireless communication device 102 is camped on a radio access technology 104 but automatically initiates 202 a search for another radio access technology 104.

The search block/module 110 may identify one or more radio access technologies 104 that can provide wireless communication between a base station 106 and the wireless communication device 102. The search block/module 110 may search for multiple types of radio access technologies 104. For example, the search block/module 110 may search for Global System for Mobile Communications (GSM) networks and Long Term Evolution (LTE) networks. In some configurations, the search block/module 110 may search one or more frequency bands of one or more radio access technologies 104. For example, by searching a band 13 in a Long Term Evolution (LTE) network and a band 1 in a Global System for Mobile Communications (GSM) network.

It may be optional for the wireless communication device 102 to determine 204 if the wireless communication device has low mobility. As described above, the term "low" as used to describe mobility may indicate a threshold range of mobility that is lower than a "medium" threshold range. The mobility determination block/module 118 may determine the mobility of the wireless communication device 102.

In some configurations, the mobility determination block/module 118 may determine the wireless communication device 102 mobility based on a number of reselections. In other words, the wireless mobility determination block/module 118 may determine wireless communication device 102 mobility based on a number of times a wireless communication device 102 changes radio access technology coverage areas 394a-c. In this example, low wireless communication device 102 mobility may indicate that a wireless communication device has made a number of reselections below a threshold number. In a similar fashion, the mobility determination block/module 118 may determine if a wireless communication device 102 has high or medium mobility (e.g., based on a threshold).

In some configurations, the wireless communication device 102 (e.g., wireless mobility determination block/module) may determine the wireless communication device 102 mobility in accordance with 3GPP specifications. In particular, section 5.2.4.3 of 3GPP TS 36.304 provides mobility state definitions (e.g., mobility states of a UE), which are given with some edits for readability as follows: Besides the Normal-mobility state, a High-mobility and a Medium-mobility state are applicable if the parameters ($T_{CRmax}$, $N_{CR\_H}$, $N_{CR\_M}$ and $T_{CRmaxHyst}$) are sent in the system information broadcast of the serving cell. State detection criteria include the following: Medium-mobility state criteria are detected if a number of cell reselections during a time period $T_{CRmax}$ exceeds $N_{CR\_M}$ and does not exceed $N_{CR\_H}$. High-mobility state criteria are detected if a number of cell reselections during a time period $T_{CRmax}$ exceeds $N_{CR\_H}$. The UE shall not count consecutive reselections between the same two cells into mobility state detection criteria if the same cell is reselected just after one other reselection. State transitions are provided as follows: The UE shall, if the criteria for High-mobility state is detected, enter High-mobility state. Otherwise, if the criteria for Medium-mobility state is detected, the UE shall enter Medium-mobility state. Otherwise, if criteria for either Medium- or High-mobility state is not detected during time period $T_{CRmaxHyst}$, the UE shall enter Normal-mobility state. If the UE is in High- or Medium-mobility state, the UE shall apply the speed dependent scaling rules as defined in sub-clause 5.2.4.3.1.

More generally, a wireless communication device 102 may have medium mobility if the number of cell reselections during a time period exceeds a parameter $N_{CR\_M}$, and does not exceed a parameter $N_{CR\_H}$. By Comparison, if the number of cell reselections during a time period exceeds the parameter $N_{CR\_H}$, then the wireless communication device 102 may have high mobility. In some configurations, the wireless communication device 102 may not count consecutive cell reselections between the same two cells into a mobility determination if the same cell is reselected just after one other reselection. In this example, if the one or more criteria for high mobility are detected, the wireless communication device 102 may enter high mobility state. If the one or more criteria for high mobility are not detected and the one or more criteria for medium mobility are detected, the wireless communication device 102 may enter medium mobility state. If the criteria for high mobility and the criteria for medium mobility are not detected, the wireless communication device may enter normal mobility state. If the wireless communication device 102 is in high mobility state or medium mobility state, the wireless communication device 102 may apply speed dependent scaling rules.

The wireless communication device 102 (e.g., UE) may utilize parameters given in 3GPP TS 36.331 in accordance with Listing (1) and Listing (2) below. In some implementations, the mobility determination block/module 118 may determine 204 if the wireless communication device 102 has low mobility according to Listing (1) as follows:

Listing (1)

```
SystemInformationBlockType3 ::= SEQUENCE {
    cellReselectionInfoCommon        SEQUENCE {
        q-Hyst                       ENUMERATED {
dB0, dB1, dB2, dB3, dB4, dB5, dB6, dB8, dB10,
    dB12, dB14, dB16, dB18, dB20, dB22, dB24},
        speedStateReselectionPars    SEQUENCE {
            mobilityStateParameters  MobilityStateParameters,
            q-HystSF                 SEQUENCE {
                sf-Medium
ENUMERATED {
    -MobilityStateParameters
```

The information element (IE) MobilityStateParameters may contain parameters to determine the wireless communication device 102 (e.g., UE) mobility state. One example of the MobilityStateParameters information element is given in Listing (2).

Listing (2)

```
-- ASN1START
    MobilityStateParameters ::=      SEQUENCE {
        t-Evaluation                 ENUMERATED {
                                        s30, s60,
    s120, s180, s240, spare3, spare2, spare1},
        t-HystNormal                 ENUMERATED {
                                        s30, s60,
    s120, s180, s240, spare3, spare2, spare1},
        n-CellChangeMedium           INTEGER (1..16),
        n-CellChangeHigh             INTEGER (1..16),
    }
```

In some configurations, the mobility determination block/module 118 may include one or more accelerometers (that provide accelerometer data, for example) and/or a locator (e.g., a global positioning system (GPS) receiver) that identifies the location of the wireless communication device 102. In these configurations, the mobility determination block/module 118 may additionally or alternatively use information obtained from the accelerometer and/or locator to determine if the wireless communication device 102 has low mobility. If the mobility determination block/module 118 detects low wireless communication device 102 mobility, it may notify the event detection block/module 108. The event detection block/module 108 may then direct the search block/module 110 to suspend the search. In some configurations, search block/module 110 may suspend the search without a change in connection state.

The wireless communication device 102 may suspend 206 the search when a first event occurs. More specifically, the event detection block/module 108 of the wireless communication device 102 may direct the search block/module 110 to suspend 206 the search when the event detection block/module 108 detects a first event. In some implementations, the first event may be initiated independent of user input. For example, the event detection block/module 108 may detect the first event automatically. In this example, the event detection block/module 108 may suspend 206 the search without initiation by a user.

In some configurations, the event detection block/module 108 may direct the search block/module 110 to suspend 206 the search when the event detection block/module 108 detects low wireless communication device 102 mobility. For example, in some options, a mobility determination block/module 118 may indicate to the event detection block/module 108 that the wireless communication device 102 has low mobility. In other words, one example of the first event is a determination that the wireless communication device 102 has low mobility. In this example, the event detection block/module 108 may direct the search block/module 110 to suspend the search. In some configurations, search block/module 110 may suspend the search without a change in connection state.

The event detection block/module 108 may direct the search block/module 110 to suspend 206 the search when the event detection block/module 108 detects a change in the wireless communication device 102 connection state. For example, if the event detection block/module 108 detects the wireless communication device 102 has changed from an idle state (e.g., an idle radio resource control state) to a connected state (e.g., a connected radio resource control state), the event detection block/module 108 may direct the search block/module 110 to suspend 206 the search. In some configurations, the event detection block/module 108 may detect a change in the wireless communication device 102 connection state based on an operation of one or more blocks/modules, for example, a state detection block/module and/or a radio resource control detection block/module.

The wireless communication device 102 may store 208 the search results 114. In some configurations, the memory 112 of the wireless communication device 102 may store 208 the search results 114. The memory 112 may be coupled to the search block/module 110. The memory 112 may store 208 the search results 114 based on a suspension of the search. For example, upon suspension of a search, the search block/module 110 may provide the search results 114 to the memory 112. In some cases, the search results 114 may include information corresponding to one or more available radio access technologies 104. In some configurations, the search results 114 may include a portion of the information corresponding to the one or more available radio access technologies 104, for example, the information corresponding to available radio access technologies 104 that were detected up to the suspension of the search.

The wireless communication device 102 may resume 210 the search based on the search results 114 when a second event occurs. More specifically, the event detection block/module 108 may direct the search block/module 110 to resume 210 the search when the event detection block/module 108 detects a second event.

The event detection block/module 108 may direct the search block/module 110 to resume 210 the search when the event detection block/module 108 detects a change in the wireless communication device 102 connection state. For example, if the event detection block/module 108 detects the wireless communication device 102 has changed from a connected state (e.g., a connected radio resource control state) to an idle state (e.g., an idle radio resource control state), the event detection block/module 108 may direct the search block/module 110 to resume 210 the search. In some configurations, the event detection block/module 108 may detect a change in the wireless communication device 102 connection state based on an operation of one or more blocks/modules, for example a state detection block/module and/or a radio resource control detection block/module. For example, the event detection block/module 108 may detect that a radio resource control connection has been released, and direct the search block/module 110 to resume 210 the search.

As described above, the event detection block/module 108 may direct the search block/module 110 to resume 210 the search when the wireless communication device 102 is in a connected state (e.g., in a connected radio resource control state). For example, when the wireless communication device 102 is in a connected state (e.g., in a connected radio resource control state), the event detection block/module 108 may determine whether connected discontinuous reception is configured and active. If connected discontinuous reception is configured and active, the event detection block/module 108 may direct the search block/module 110 to resume the search during gaps when the wireless communication device 102 is in a sleep mode during connected discontinuous reception.

In some configurations, the event detection block/module 108 may direct the search block/module 110 to resume 210 the search based on an attempt at connection. For example, the event detection block/module 108 may detect an attempt by the wireless communication device 102 to establish a connection with a radio access technology 104 (e.g., a radio resource control connection). In the event a connection cannot be established, and the wireless communication device 102 is in an idle state, the event detection block/module 108 may direct the search block/module 110 to resume 210 the search.

In some implementations, the search block/module 110 may resume 210 the search based on the search results 114. As described above, the search results 114 may include information corresponding to a portion of one or more available radio access technologies 104 detected during a search up to a suspension of the search. The search block/module 110 may resume searching for radio access technologies 104 from the point of the suspension of the search. For example, suppose a wireless communication device 102 initiates 202 a search for one or more radio access technologies 104 over a certain number of frequency bands. Upon suspension, the wireless communication device 102 may have searched a portion of the certain number of frequency bands. Information corresponding to the portion that has been searched may be stored in the memory 112 as search results 114. In this example, the memory 112 may provide the search results 114 to the search block/module 110. The search block/module 110 may resume 210 the search by searching the portion of the certain number of frequency bands that was not searched upon the suspension of the search.

Figure 3:
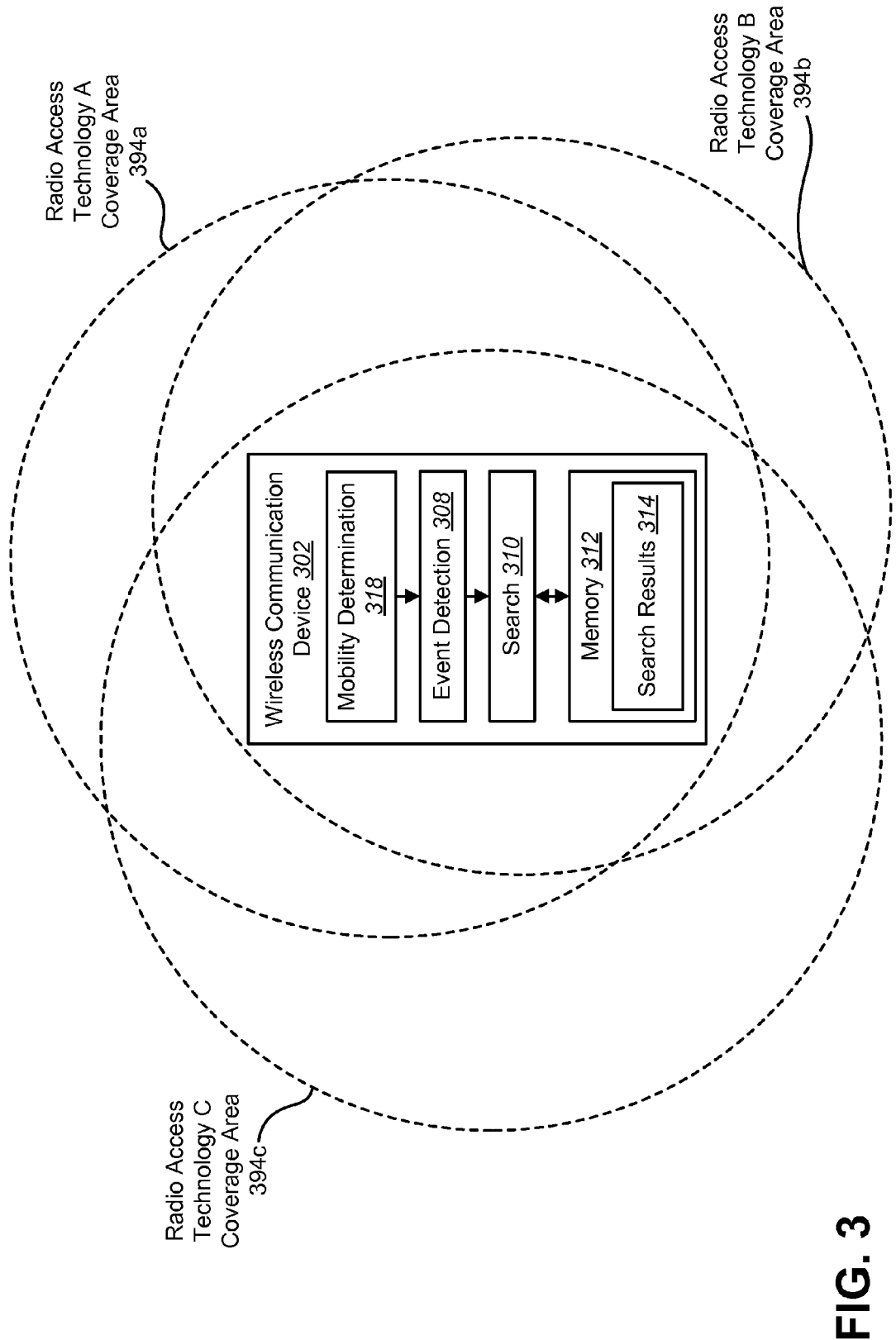
FIG. 3 is a diagram illustrating one configuration of a wireless communication device and one or more radio access technology coverage areas in which a search for radio access technologies may be performed.

FIG. 3 is a diagram illustrating one configuration of a wireless communication device 302 and one or more radio access technology coverage areas 394*a-c* in which a search for radio access technologies 104 may be performed. The wireless communication device 302 may be similar to the wireless communication device 102 described in connection with FIG. 1. For example, the wireless communication device 302 may include an event detection block/module 308, a search block/module 310 and memory 312 that may be examples of corresponding elements described in connection with FIG. 1. The memory 312 may include search results 314 similar to the search results 114 described in connection with FIG. 1. As described above, the wireless communication device 302 may optionally include a mobility determination block/module 318 similar to the optional mobility determination block/module 118 described in connection with FIG. 1.

One or more radio access technology coverage areas 394*a-c* may be available to the wireless communication device 302. A radio access technology coverage area 394*a-c* may indicate a geographic region where a radio access technology 104 may communicate with the wireless communication device 302 (e.g., provide a network link to a base station 106). The one or more radio access technology coverage areas 394*a-c* may provide different types of communication links. For example, radio access technology coverage area A 394*a* may provide the wireless communication device 302 with a Global System for Mobile Communication (GSM) network link, radio access technology coverage area B 394*b* may provide a Wideband Code Division Multiple Access (W-CDMA) network link and radio access technology coverage area C 394*c* may provide a Long Term Evolution (LTE) network link.

In some examples, the wireless communication device 302 may select to camp on one or more radio access technologies 104 corresponding to the one or more radio access technology coverage areas 394*a-c*. This may be done by performing a search for one or more radio access technologies 104. As described above, a search block/module 310 may initiate a search for one or more radio access technologies 104. In some configurations, the search may be initiated based on received input. For example, the wireless communication device 302 may receive input (e.g., from a user via a display) to initiate the search. The wireless communication device 302 may search for one or more radio access technologies 104. Once a search has been completed, the wireless communication device 302 may select from one or more detected radio access technologies 104 and camp on a particular radio access technology 104. In some configurations, this selection may be based on user input.

In some configurations, the wireless communication device 302 may select from a portion of the available radio access technologies 104, for example, when a search is suspended or stopped. For example, the search may be stopped when a third event occurs. In this case, the wireless communication device 302 may select from the portion of the available radio access technologies 104 detected until the search was stopped and/or suspended. While FIG. 3 depicts three radio access technology coverage areas 394*a-c*, any number of radio access technology coverage areas 394*a-c* may be available.

Figure 4:
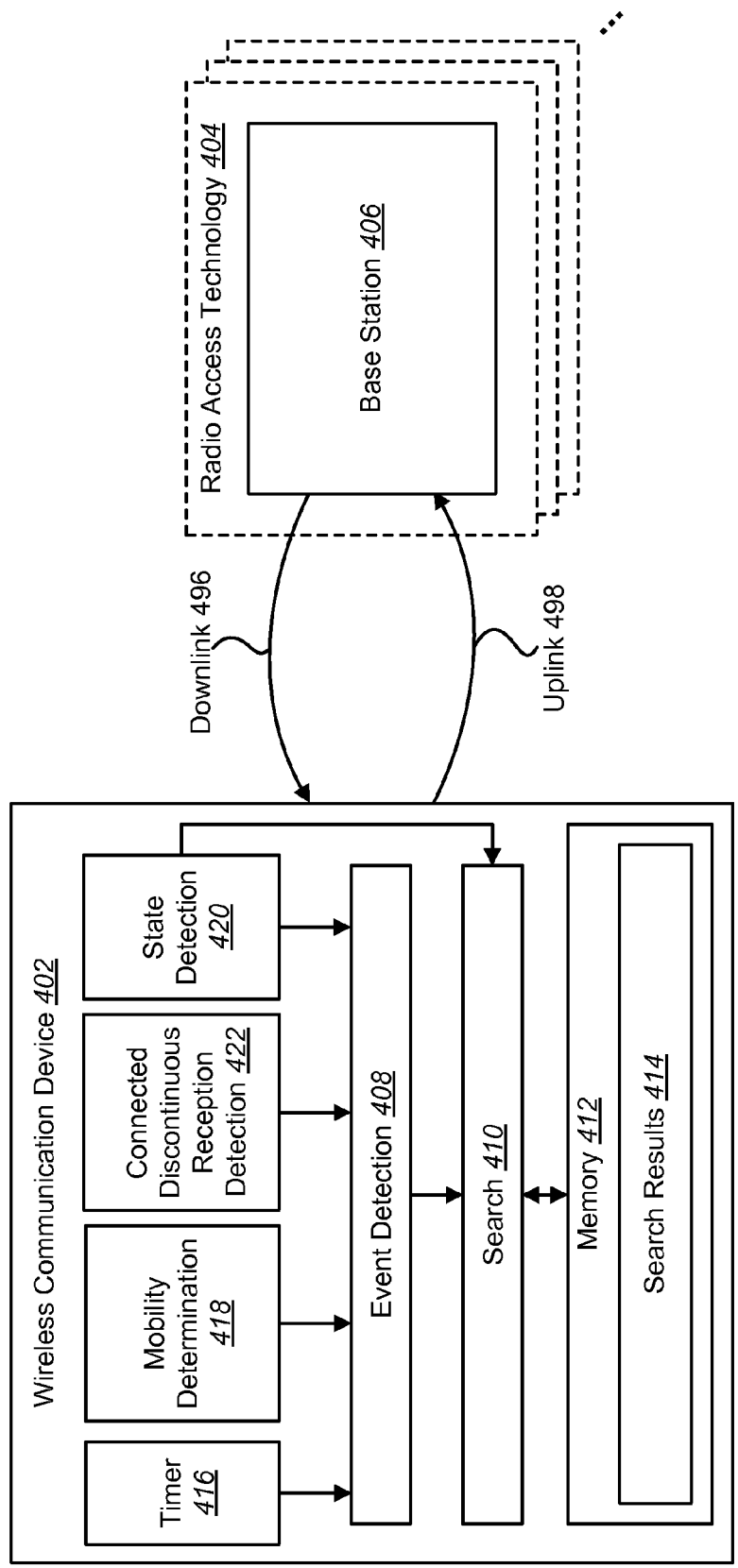
FIG. 4 is a block diagram illustrating another configuration of a wireless communication device and one or more radio access technologies in which systems and methods for searching for radio access technologies may be implemented.

FIG. 4 is a block diagram illustrating another configuration of a wireless communication device 402 and one or more radio access technologies 404 in which systems and methods for searching for radio access technologies 404 may be implemented. The one or more radio access technologies 404 may be similar to the one or more radio access technologies 104 described earlier. The one or more radio access technologies 404 may include one or more base stations 406 similar to the one or more base stations 106 described in connection with FIG. 1. The wireless communication device 402 may be similar to the wireless communication device 102 described in connection with FIG. 1.

Communications between the wireless communication device 402 and base station 406 may be achieved through transmissions over a wireless link. The wireless communication device 402 may communicate with the one or more base stations 406 on the downlink 496 and/or uplink 498 at any given moment. The downlink 496 and/or uplink 498 may be similar to corresponding elements described in connection with FIG. 1.

A wireless communication device 402 may be capable of communicating with the one or more base stations 406 as part of one or more radio access technologies 404. In some implementations, the one or more radio access technologies 404 may be similar to the one or more radio access technologies 104 described in connection with FIG. 1.

The wireless communication device 402 may include an event detection block/module 408, a mobility determination block/module 418, a search block/module 410, memory 412 and/or search results 414 similar to corresponding elements described in connection with FIG. 1.

In some configurations, a timer 416 may be coupled to the event detection block/module 408. The timer 416 may determine the elapsed duration of a search. The timer 416 may include a time interval at the expiration of which the search may be suspended. The timer 416 may detect the expiration of a time interval. The timer 416 may indicate to the event detection block/module 408 that the time interval has expired. The event detection block/module 408 may then direct the search block/module 410 to stop the search. In some cases, the expiration of the time interval may correspond to a partially completed search.

A state detection block/module 420 may be coupled to the event detection block/module 408 and/or the search block/module 410. In one configuration, the state detection block/module 420 may detect the wireless communication device 402 connection state. For example, the state detection block/module 420 may detect if there is a radio resource control connection between the base station 406 and the wireless communication device 402. The state detection block/module 420 may detect one or more connection states. For example, the state detection block/module 420 may detect an idle wireless communication device 402 state (e.g., an idle radio resource control state) and/or a connected wireless communication device 402 state (e.g., a connected radio resource control state). A connected state may denote a logical connection between the wireless communication device 402 and the base station 406 where data is being transmitted.

In one configuration, the state detection block/module 420 may detect a change in the wireless communication device 402 connection state. In one example, the state detection block/module 420 may detect a change from an idle state to a connected state. In this example, the state detection block/module 420 may indicate to the event detection block/module 408 this change in state. The event detection block/module 408 may direct the search block/module 410 to suspend the search.

The state detection block/module 420 may detect a change from a connected state to an idle state. In this example, the state detection block/module 420 may indicate to the event detection clock/module 408 the change in state. The event detection block/module 408 may direct the search block/module 410 to resume the search. In some implementations, the state detection block/module 420 may detect this change in state (e.g., from a connected state to an idle state) by detecting a release of the radio resource control connection.

The state detection block/module 420 may detect if a connection has been requested. For example, the state detection block/module 420 may detect a connection (e.g., a radio resource control connection) has been requested. In this example the state detection block/module 420 may indicate to the event detection block module 408 that a connection has been requested.

If the state detection block/module 420 detects a connection has not been requested, the state detection block/module 420 may direct the search block/module 410 to continue with the search. In one configuration, the state detection block/module 420 may indicate to the event detection block/module 408 that a connection has been requested, but the wireless communication device 402 is not in a connected state (e.g., the wireless communication device 402 is in an idle state). In this configuration, the event detection block/module 408 may direct the search block/module 410 to resume the search.

A connected discontinuous reception detection block/module 422 may be coupled to the event detection block/module 408. The connected discontinuous reception detection block/module 422 may detect whether connected discontinuous reception is configured and active between the wireless communication device 402 and a radio access technology 404. In some examples, connected discontinuous reception may include a wireless communication device 402 in a connected state (e.g., a connected radio resource control state) with a radio access technology 404. In this example, the wireless communication device 402 and the radio access technology 404 may establish a pattern of periods of transmission/reception of data and periods of sleep. As used herein, the term "sleep" indicates a period during connected discontinuous reception when a wireless communication device 402 is in a connected state, but is not in an active transmission mode.

In some implementations, connected discontinuous reception (C-DRX) may be configured in a connected state (e.g., RRC_CONNECTED). For example, the wireless communication device 402 (e.g., a user equipment) may not monitor downlink channels when connected discontinuous reception is enabled. An example of a connected discontinuous reception cycle is given as follows. A wireless communication device 402 (e.g., a user equipment) may wake up for a period (e.g., OnDuration) to monitor a physical downlink control channel (PDCCH). In this example, the wireless communication device 402 may skip reception during a long or short, discontinuous reception (e.g., Long/Short DRX) period. The wireless communication device 402 may do this to save battery. In some implementations, this involves a tradeoff between battery saving and latency. A short discontinuous reception (e.g., Short DRX) may accommodate high data rate applications where a wireless communication device 402 (e.g., the user equipment) may be expected to have frequent scheduling. A long discontinuous reception (e.g., Long DRX) may accommodate web browsing traffic. If the connected discontinuous reception detection block/module 422 detects that connected discontinuous reception is configured and active, the connected discontinuous reception block/module 422 may indicate the event detection block/module 408. The event detection block/module 408 may then direct the search block/module 410 to resume the search during one or more periods of sleep. In other words the search block/module 410 may suspend the search during periods of transmission/reception of data and resume the search during periods of sleep.

Figure 5:
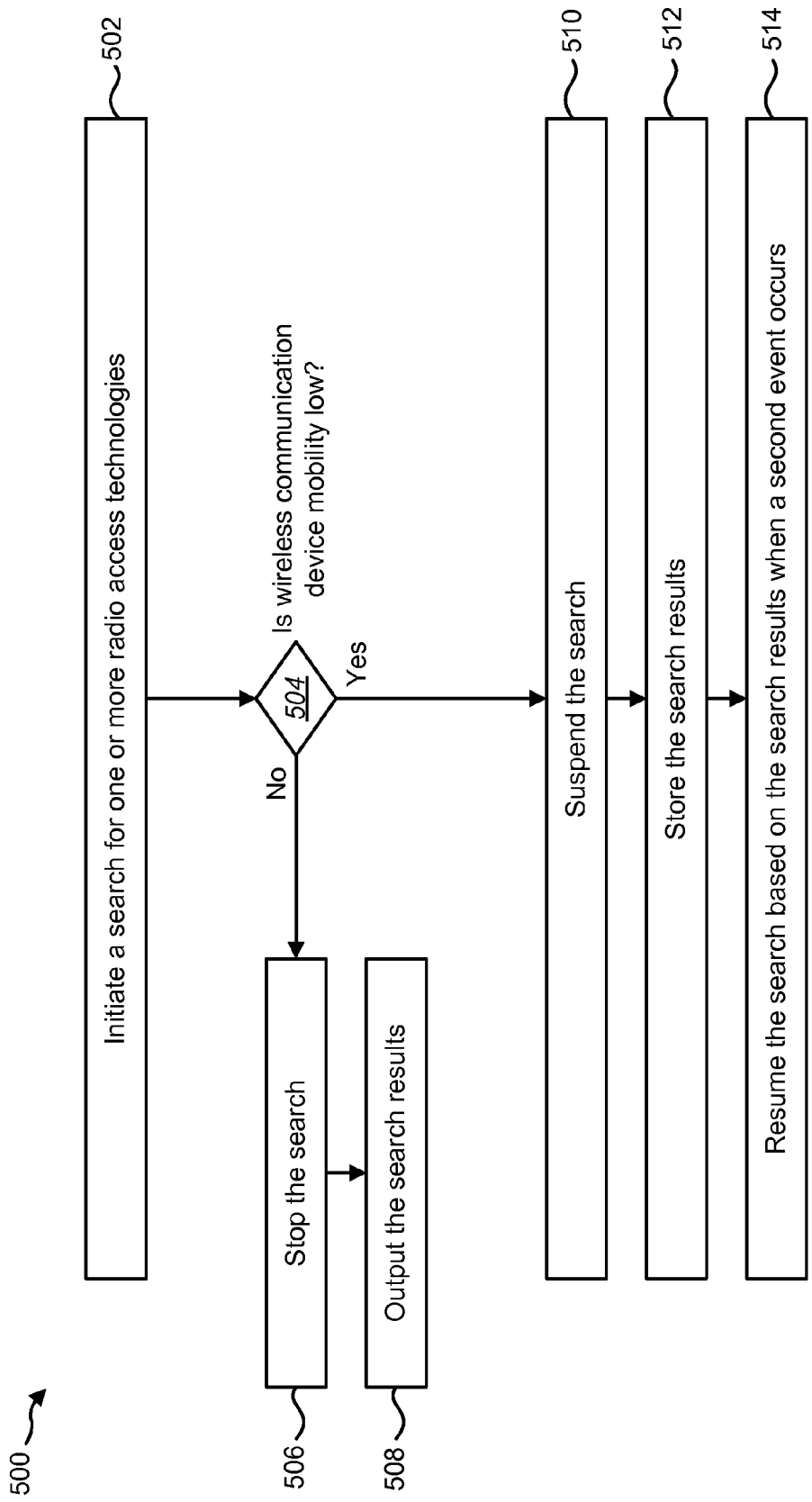
FIG. 5 is a flow diagram illustrating another configuration of a method for searching for radio access technologies.

FIG. 5 is a flow diagram illustrating another configuration of a method 500 for searching for radio access technologies 404. The method 500 may be performed by a wireless communication device 402. The search block/module 410 of the wireless communication device 402 may initiate 502 a search for one or more radio access technologies 404. In some implementations, this may be done as described in connection with FIG. 2.

In one configuration, the mobility determination block/module 418 of the wireless communication device 402 may determine 504 if the wireless communication device 402 mobility is low. In some implementations, this may be done as described in connection with FIG. 2.

If the mobility determination block/module 418 determines 504 that the wireless communication device 402 mobility is not low (e.g., it has high or medium mobility), the wireless communication device 402 may stop 506 the search. For example, the mobility determination block/module 418 may indicate to the event detection block/module 408 that the wireless communication device 402 does not have low mobility (e.g., it has high or medium mobility). The event detection block/module 408 may then direct the search block/module 410 to stop 506 the search.

In some configurations, the search block/module 410 of the wireless communication device 402 may output 508 the search results 414. For example, the event detection block/module 408 may direct the search block/module 410 to stop 506 the search. The search block/module 410 may output the search results 414. As described above, the search results 414 may include information corresponding to a portion of the detected radio access technologies 404 discovered during the search up to the stopping point. In some configurations, the search block/module 410 may provide the search results 414 to a display (not shown) to display the search results to a user.

If the mobility determination block/module 418 determines 504 that the wireless communication device 402 mobility is low, the wireless communication device 402 may suspend 510 the search. In some implementations, this may be done as described in connection with FIG. 2.

The wireless communication device 402 may store 512 the search results 414. In some implementations, this may be done as described in connection with FIG. 2.

The wireless communication device 402 may resume 514 the search based on the search results 414 when a second event occurs. In some implementations, this may be done as described in connection with FIG. 2.

Figure 6:
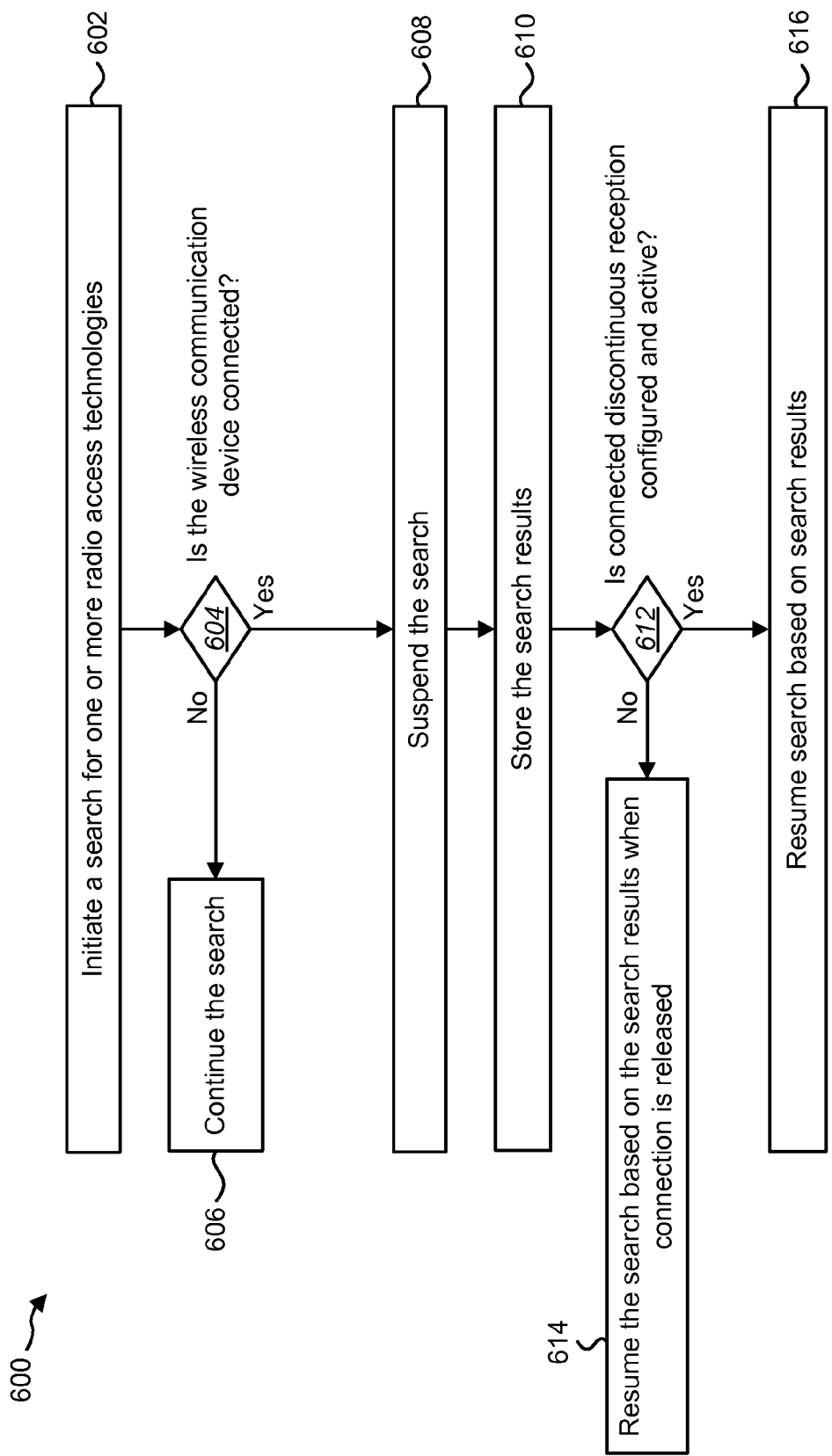
FIG. 6 is a flow diagram illustrating another configuration of a method for searching for radio access technologies.

FIG. 6 is a flow diagram illustrating another configuration of a method 600 for searching for radio access technologies 404. The method 600 may be performed by a wireless communication device 402. The search block/module 410 of the wireless communication device 402 may initiate 602 a search for one or more radio access technologies 404. In some implementations, this may be done as described in connection with FIG. 2.

In one configuration, the state detection block/module 420 may determine 604 if the wireless communication device 402 is connected. For example, the state detection block/module 420 may determine 604 if there is a connected radio resource control between the wireless communication device 402 and the base station 406.

If the state detection block/module 420 determines 604 that the wireless communication device 402 is not connected (e.g., in an idle radio resource control state), the search block/module 410 may continue 606 the search. In other words, if the wireless communication device 402 is not in a connected radio resource control state, the search block/module 410 may continue to search for one or more radio access technologies 404.

If the state detection block/module 420 determines 604 that the wireless communication device 402 is connected (e.g., in a connected radio resource control state), the wireless communication device 402 may determine 608 if the wireless communication device 402 has low mobility. In some implementations, this may be done as described in connection with FIG. 2. The wireless communication device 402 may suspend 610 the search. In some implementations, this may be done as described in connection with FIG. 2.

The wireless communication device 402 may store 612 the search results 414. In some implementations, this may be done as described in connection with FIG. 2.

In one configuration, the connected discontinuous reception detection block/module 422 may determine 614 if connected discontinuous reception is configured and active. As described above, connected discontinuous reception may include a wireless communication device 402 in a connected state with a radio access technology 404 with intermittent periods of transmission/reception of data and sleep. In this configuration, the wireless communication device 402 may be connected to a radio access technology 404.

In one configuration, the connected discontinuous reception detection block/module 422 determines 614 that connected discontinuous reception is not configured and active. It should be noted in this configuration, the wireless communication device 402 may be connected to the radio access technology 404. In this example, the wireless communication device 402 may resume 616 the search based on the search results 414 when the connection is released. For example, if the state detection block/module 420 detects a change in the connection state (e.g., from a connected radio resource control state to an idle radio resource control state), it may notify the event detection block/module 408. The event detection block/module 408 may then direct the search block/module 410 to resume the search. In some implementations, the search block/module 410 may resume the search based on the search results 414. For example, when given direction by the event detection block/module 408 to resume a search, the search block/module 410 may obtain the search results 414 (e.g., results that were obtained up to a first event) from the memory 412, and resume the search from that point.

If the connected discontinuous reception detection block/module 422 determines 614 that connected discontinuous reception is configured and active, the wireless communication device 402 may resume 618 the search results based on the search results 414. More specifically, the connected discontinuous reception detection block/module 422 may indicate to the event detection block/module 408 that connected discontinuous reception is configured and active. The event detection block/module 408 may then direct the search block/module 410 to resume 618 the search based on the search results 414. In some implementations, the event detection block/module 408 may direct the search block module 410 to resume 618 the search during gaps when the wireless communication device 402 is in a sleep mode during connected discontinuous reception.

Figure 7:
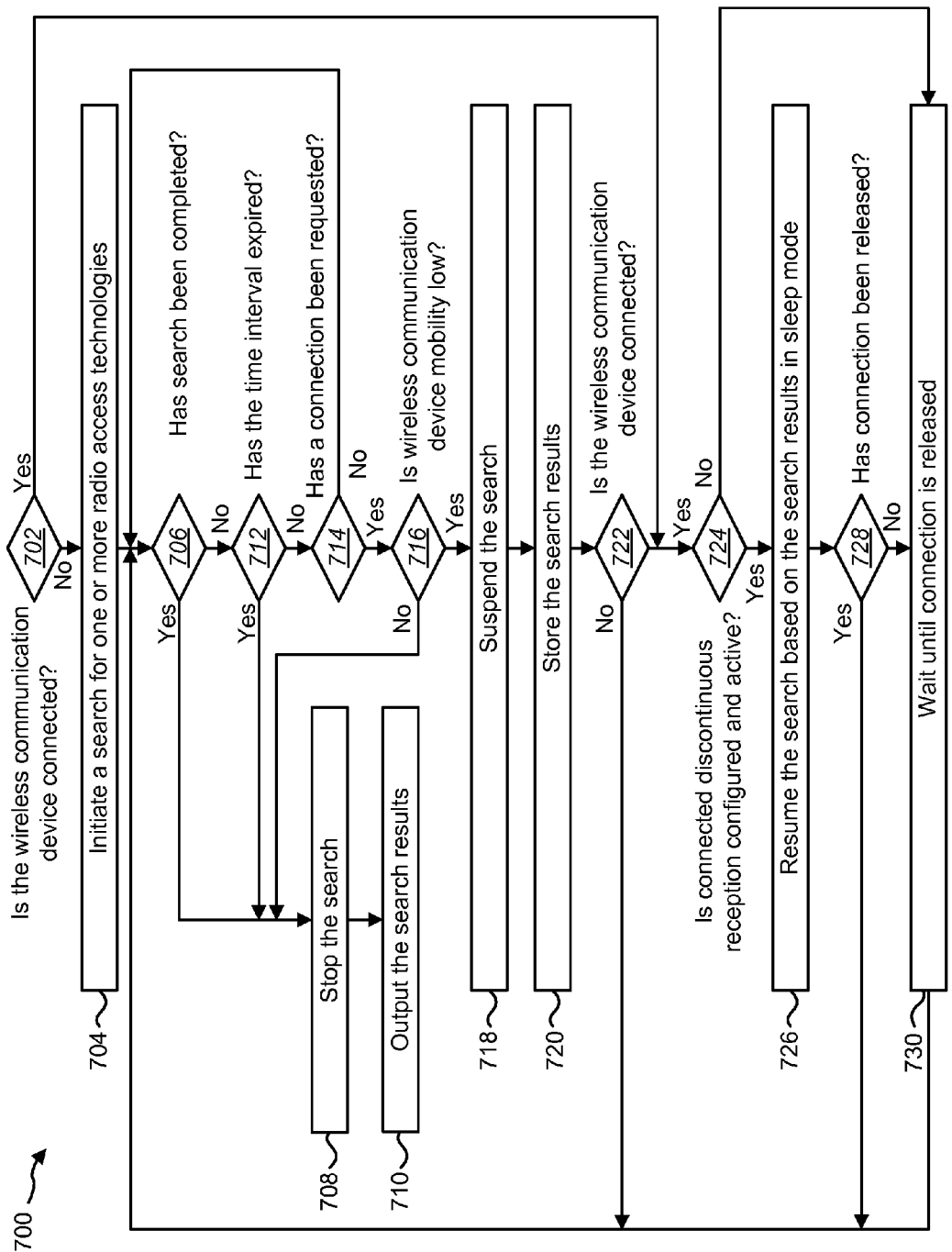
FIG. 7 is a flow diagram illustrating another configuration of a method for searching for radio access technologies.

FIG. 7 is a flow diagram illustrating another configuration of a method 700 for searching for radio access technologies 404. The method 700 may be performed by a wireless communication device 402. In some implementations, the state detection block/module 420 may determine 702 if the wireless communication device 402 is connected. As described above, the state detection block/module 420 may detect one or more connection states, for example a connected state (e.g., a connected radio resource control state) and an idle state (e.g., an idle radio resource control state). For example, the state detection block/module 420 may determine 702 if there is a radio resource control connection between the radio access technology 404 and the wireless communication device 402. If the state detection block/module 420 determines 702 that the wireless communication device 402 is in a connected state, the wireless communication device 402 may determine 724 if connected discontinuous reception is configured and active as described herein.

The search block/module 410 of the wireless communication device 402 may initiate 704 a search for one or more radio access technologies 404. In some implementations, this may be done as described in connection with FIG. 2.

The wireless communication device 402 may determine 706 if the search has been completed. In some configurations, a search may be completed when a determined number of bands corresponding to one or more radio access technologies 404 have been searched. In some cases, a search may be completed before the expiration of a time interval. If the wireless communication device 402 determines that the search has been completed, the wireless communication device 402 may stop 708 the search. For example, the event detection block/module 408 may detect that a search has been completed and may direct the search block/module 410 to stop the search. In some implementations, stopping 708 the search may be done as described in connection with FIG. 5.

In some configurations, the wireless communication device 402 may output 710 the search results 414. In some implementations, this may be done as described in connection with FIG. 5.

If the wireless communication device 402 determines 706 that a search has not been completed, the timer 416 of the wireless communication device 402 may determine 712 if a time interval has expired. As described above, the timer 416 may determine the elapsed duration of a search. If the timer 416 detects that the elapsed duration is greater than the time interval, the timer 416 may indicate to the event detection block/module 408 that the time interval has expired. In this configuration, the event detection block/module 408 may direct the search block/module 410 to stop 708 the search. In some cases, the expiration of the time interval may correspond to a partially completed search. In some implementations, stopping 708 the search may be done as described above. In this configuration, the search block/module 410 may output 710 the search results 414. In some implementations, outputting 710 the search results 414 may include outputting 710 a portion of the search results 414 (e.g., the portion searched up to the point of the expired time interval). In some implementations, this may be done as described above.

If the timer 416 determines 712 that the time interval has not expired, the state detection block/module 420 may determine 714 if a connection has been requested. For example, the state detection block/module 420 may determine 714 if a connection (e.g., a radio resource control connection) has been requested. If the state detection block/module 420 determines 714 that a connection has not been requested, the state detection block/module 420 may direct the search block/module 410 to continue searching for one or more radio access technologies 404. By comparison, if the state detection block/module 420 determines 714 that a connection has been requested, the mobility determination block/module 418 may determine 716 if the wireless communication device 402 has low mobility. In some implementations, this may be done as described in connection with FIG. 5.

If the mobility determination block/module 418 determines 716 that the wireless communication device 402 does not have low mobility (e.g., it has high or medium mobility), the event detection block/module 408 may direct the search block/module 410 to stop 708 the search. In some implementations, this may be done as described above. In this configuration, the search block/module 410 may output 710 the search results 414. In some implementations, this may be done as described above.

If the mobility determination block/module 418 determines 716 that the wireless communication device 402 has low mobility, the event detection block/module 408 may direct the search block/module 410 to suspend 718 the search. In some implementations, this may be done as described in connection with FIG. 2.

The wireless communication device 402 may store 720 the search results 414. In some implementations, this may be done as described in connection with FIG. 2.

The state detection block/module 420 may determine 722 if the wireless communication device 402 is connected. For example, the state detection block/module 420 may determine 722 if the wireless communication device 402 has a radio resource control connection with a radio access technology 404. If the state detection block/module 420 determines 722 that the wireless communication device 402 is not connected (e.g., an idle radio resource control connection), the state detection block/module 420 may indicate this to the event detection block/module 408. For example, the state detection block/module 420 may indicate that the wireless communication device 402 attempted to connect to a radio access technology 404, but failed to establish a connection. In this example, the event detection block/module 408 may direct the search block/module 410 to resume the search.

If the state detection block/module 420 determines 722 that the wireless communication device 402 is connected, the connected discontinuous reception detection block/module 422 may determine 724 if connected discontinuous reception is configured and active. In some configurations this may be done as described in connection with FIG. 6. If the connected discontinuous reception detection block/module 422 determines 724 that connected discontinuous reception is not configured and active, the wireless communication device 402 may wait 730 until the connection is released. At which, point the event detection block/module 408 of the wireless communication device 402 may direct the search block/module 410 to resume the search based on the search results 414. In some implementations, this may be done as described in connection with FIG. 6.

If the state detection block/module 420 determines 724 that connected discontinuous reception is configured and active, the event detection block/module 408 may direct the search block/module 410 to resume 726 the search based on the search results. In some implementations, the event detection block/module 408 may direct the search block/module 410 to resume 726 the search during intermittent periods of sleep during connected discontinuous reception.

In some implementations, the state detection block/module 420 may determine 728 if the connection has been released. As described above, the state detection block/module 420 may detect a change from a connected state (e.g., a connected radio resource control state) to an idle state (e.g., an idle radio resource control state). In some examples, the state detection block/module 420 may detect a change in state by detecting a release of the radio resource control. If the state detection block/module 420 detects a connection (e.g., a radio resource control connection) has not been released, the wireless communication device 402 may wait 730 until the connection is released. At this point, the state detection block/module 420 may notify the event detection block/module 408 of the change in state. The event detection block/module 408 may direct the search block/module 410 to resume the search. If the connection has been released, the state detection block/module 420 may notify the event detection block/module 408 of the change in state. The event detection block/module 408 may direct the search block/module 410 to resume the search. In some implementations, resuming the search may be done as described above.

Figure 8:
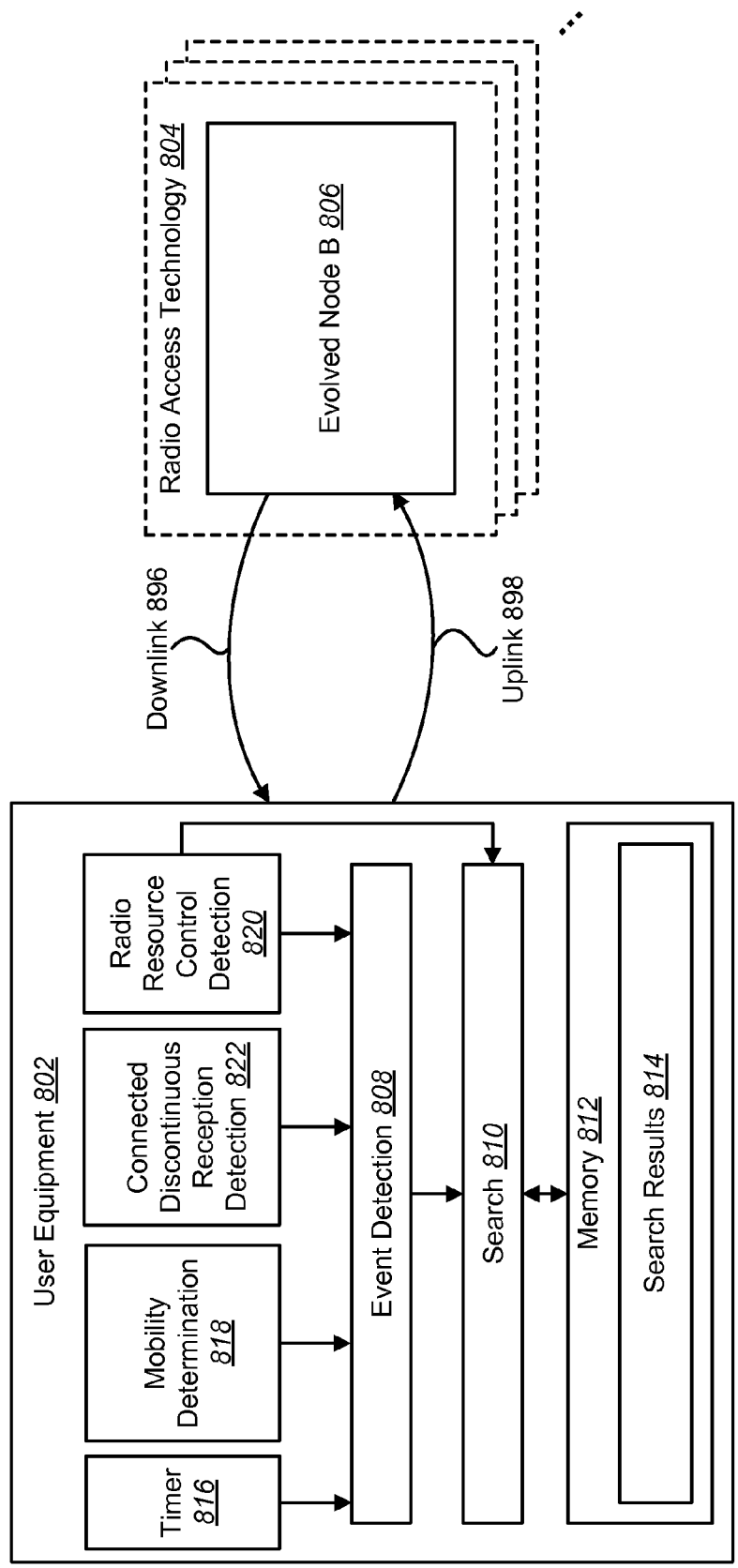
FIG. 8 is a block diagram illustrating a configuration of a user equipment and one or more radio access technologies in which systems and methods for searching for radio access technologies may be implemented.

FIG. 8 is a block diagram illustrating a configuration of a user equipment 802 and one or more radio access technologies 804 in which systems and methods for searching for radio access technologies 804 may be implemented. The one or more radio access technologies 804 may include one or more evolved Node Bs 806. The one or more evolved Node Bs 806 may be an example of the one or more base stations 106, 406 described earlier.

Communications between the user equipment 802 and one or more evolved Node Bs 806 may be achieved through transmissions over a wireless link. The user equipment 802 may communicate with the one or more evolved Node Bs 806 on the downlink 896 and/or uplink 898 at any given moment. The downlink 896 and/or the uplink 898 may be similar to corresponding elements described in connection with FIG. 1.

A user equipment 802 may be capable of communicating with the one or more evolved Node Bs 806 as part of one or more radio access technologies 804. In some implementations, the one or more radio access technologies 804 may be similar to the one or more radio access technologies 104, 404 described earlier.

The user equipment 802 may be an example of the wireless communication device 102, 402 described earlier. The user equipment 802 may include an event detection block/module 808, a search block/module 810, memory 812, search results 814, a timer 816, a mobility determination block/module 818 and/or a connected discontinuous reception detection block/module 822 similar to corresponding elements described above.

A radio resource control detection block/module 820 may be coupled to the event detection block/module 808 and/or the search block/module 810. In one configuration, the radio resource control detection block/module 820 may detect the user equipment 802 radio resource control state. For example, the radio resource control detection block/module 820 may detect if there is a radio resource control connection between the evolved Node B 806 and the user equipment 802. The radio resource control detection block/module 820 may detect one or more radio resource control states. For example, the radio resource control detection block/module 820 may detect an idle radio resource control state and/or a connected radio resource control state. A connected radio resource control may denote a logical connection between the user equipment 802 and the evolved Node B 806, where data is being transmitted.

In one configuration, the radio resource control detection block/module 820 may detect a change in the user equipment 802 radio resource control state. In one example, the radio resource control detection block/module 820 may detect a change from an idle radio resource control state to a connected radio resource control state. In this example, the radio resource control detection block/module 820 may indicate to the event detection block/module 808 this change in radio resource control state. The event detection block/module 408 may direct the search block/module 810 to suspend the search.

The radio resource control detection block/module 820 may detect a change from a connected radio resource control state to an idle radio resource control state. In this example, the radio resource control detection block/module 820 may indicate to the event detection clock/module 808 the change in radio resource control state. The event detection block/module 808 may direct the search block/module 810 to resume the search. In some implementations, the radio resource control detection block/module 820 may detect this change in radio resource control state (e.g., from a connected radio resource control state to an idle radio resource control state) by detecting a release of the radio resource control.

The radio resource control detection block/module 820 may detect if a radio resource control connection has been requested. If the radio resource control detection block/module 820 detects a radio resource control connection has been requested, the radio resource control detection block/module 820 may indicate to the event detection block/module 808 that a connection has been requested.

If the radio resource control detection block/module 820 detects a radio resource control connection has not been requested, the radio resource control detection block/module 820 may direct the search block/module 810 to continue with the search. In one configuration, the radio resource control detection block/module 820 may indicate to the event detection block/module 808 that a radio resource control connection has been requested, but the user equipment 802 is not in a connected radio resource control state. In this configuration, the event detection block/module 808 may direct the search block/module 810 to resume the search.

Figure 9:
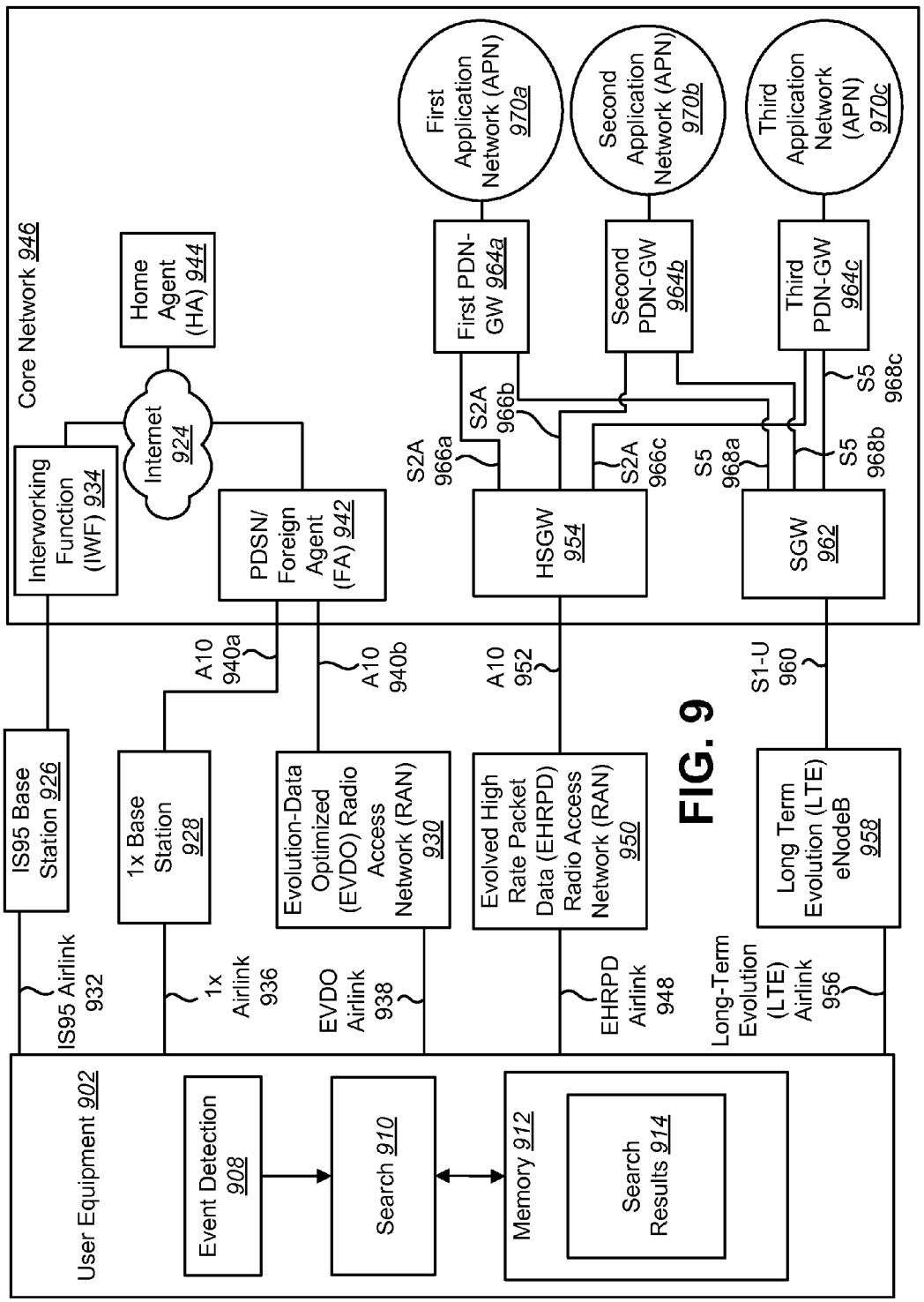
FIG. 9 is a block diagram illustrating various types of connectivity between a user equipment and a core network that the user equipment may utilize for data services and/or voice services.

FIG. 9 is a block diagram illustrating various types of connectivity between a user equipment 902 and a core network 946 that the user equipment 902 may utilize for data services and/or voice services. The user equipment 902 of FIG. 9 may be one configuration of the wireless communication device 102 of FIG. 1. For example, the user equipment 902 may include an event detection block/module 908, a search block/detection module 910 and/or memory 912 similar to corresponding elements described above. The memory 912 may include search results 914 similar to search results 114 described previously. Multiple air interfaces (or airlinks) may provide a data connection for a user equipment 902 to the Internet 924 via an Interim Standard 95 (IS95) base station 926, a CDMA 2000 1× (referred to herein as "1×", may also be referred to as IS-2000 or 1×RTT) base station 928 and/or an Evolution-Data Optimized (EVDO) radio access network (RAN) 930. The IS95 base station 926 may provide an IS95 airlink 932 for the user equipment 902. The IS95 base station 926 may be connected to the Internet 924 via an InterWorking Function (IWF) 934. The 1× base station 928 may provide a 1× airlink 936 to the user equipment 902. The Evolution-Data Optimized (EVDO) radio access network (RAN) 930 may provide an Evolution-Data Optimized (EVDO) airlink 938 to the user equipment 902. The 1× base station 928 and Evolution-Data Optimized (EVDO) radio access network (RAN) 930 may be connected via A10 interfaces 940*a-b* to a Packet Data Serving Node (PDSN) 942, which in turn is connected to the Internet 924. The Packet Data Serving Node (PDSN) 942 may include a Foreign Agent (FA). A Home Agent (HA) 944 may be connected to the Internet 924.

The network architecture may include data connectivity via the evolved high rate packet data (EHRPD) airlink 948 and an evolved high rate packet data (EHRPD) radio access network (RAN) 950 to the core network 946. The evolved high rate packet data (EHRPD) radio access network (RAN) 950 may employ an A10 interface 952 to connect to an HRPD Serving Gateway (HSGW) 954. The network architecture may also include data connectivity via the Long Term Evolution (LTE) airlink 956 and Long Term Evolution (LTE) eNodeB 958. The Long Term Evolution (LTE) eNodeB 958 may employ an S1-U interface 960 to connect to a Serving Gateway (SGW) 962. The HRPD Serving Gateway (HSGW) 954 may connect to a first Packet Data Network Gateway (PDN-GW) 964*a*, a second Packet Data Network Gateway (PDN-GW) 964*b* and a third Packet Data Network Gateway (PDN-GW) 964*c* via S2A interfaces 966*a-c*. The Serving Gateway (SGW) 962 may connect with the first Packet Data Network Gateway (PDN-GW) 964*a*, the second Packet Data Network Gateway (PDN-GW) 964*b* and the third Packet Data Network Gateway (PDN-GW) 964*c* via S5 interfaces 968*a-c*. The first Packet Data Network Gateway (PDN-GW) 964*a* may connect to a first Application Network (APN) 970*a*. The second Packet Data Network Gateway (PDN-GW) 964*b* may connect to a second Application Network (APN) 970*b*. The third Packet Data Network Gateway (PDN-GW) 964*c* may connect to a third Application Network (APN) 970*c*. An Application Network (APN) 970 may include, but is not limited to, an Internet Multimedia System (IMS) that a user equipment 902 connects to for obtaining Voice over IP (VoIP) or video telephony services or an Administrative Application Network (APN) the user equipment 902 may establish a connection with in order to download configuration information for the user equipment 902.

Figure 10:
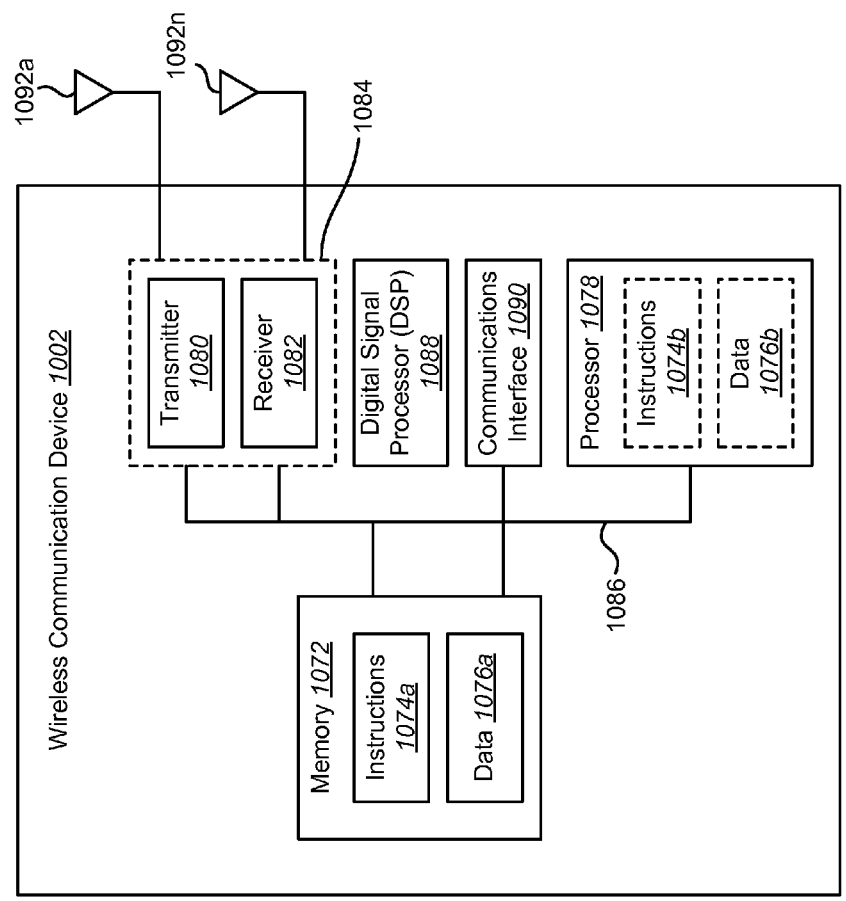
FIG. 10 illustrates certain components that may be included within a wireless communication device.

FIG. 10 illustrates certain components that may be included within a wireless communication device 1002. The wireless communication device 1002 may be implemented in accordance with one or more of the wireless communication devices 102, 302, 402 and the user equipment 802 described above. The wireless communication device 1002 may be an access terminal, a mobile station, a user equipment, etc. The wireless communication device 1002 includes a processor 1078. The processor 1078 may be a general purpose single- or multi-chip microprocessor (e.g., an ARM), a special purpose microprocessor (e.g., a digital signal processor (DSP)), a microcontroller, a programmable gate array, etc. The processor 1078 may be referred to as a central processing unit (CPU). Although just a single processor 1078 is shown in the wireless communication device 1002 of FIG. 10, in an alternative configuration, a combination of processors (e.g., an ARM and DSP) could be used.

The wireless communication device 1002 also includes memory 1072. The memory 1072 may be any electronic component capable of storing electronic information. The memory 1072 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1076*a* and instructions 1074*a* may be stored in the memory 1072. The instructions 1074*a* may be executable by the processor 1078 to implement the methods disclosed herein. Executing the instructions 1074*a* may involve the use of the data 1076*a* that is stored in the memory 1072. When the processor 1078 executes the instructions 1074*a*, various portions of the instructions 1074*b* may be loaded onto the processor 1078, and various pieces of data 1076*b* may be loaded onto the processor 1078.

The wireless communication device 1002 may also include a transmitter 1080 and a receiver 1082 to allow transmission and reception of signals to and from the wireless communication device 1002. The transmitter 1080 and receiver 1082 may be collectively referred to as a transceiver 1084. Multiple antennas 1092*a-n* may be electrically coupled to the transceiver 1084. The wireless communication device 1002 may also include (not shown) multiple transmitters, multiple receivers, multiple transceivers and/or additional antennas.

The wireless communication device 1002 may include a digital signal processor (DSP) 1088. The wireless communication device 1002 may also include a communications interface 1090. The communications interface 1090 may allow a user to interact with the wireless communication device 1002.

The various components of the wireless communication device 1002 may be coupled together by one or more buses, which may include a power bus, a control signal bus, a status signal bus, a data bus, etc. For the sake of clarity, the various buses are illustrated in FIG. 10 as a bus system 1086.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 5-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for searching for one or more radio access technologies by a wireless communication device, comprising:
   initiating a search for the one or more radio access technologies based on one or more Long Term Evolution (LTE) connection states;
   determining if a mobility of the wireless communication device is lower than a predetermined threshold;
   stopping the search and presenting search results on a display if it is determined that the mobility of the wireless communication device is not lower than the predetermined threshold;
   suspending the search on a condition that a first event occurs, wherein the first event comprises a determination that the mobility of the wireless communication device is lower than the predetermined threshold;
   storing the search results; and
   resuming the search, during connected discontinuous reception, in response to determining that the wireless communication device is in a connected radio resource control state and in response to determining that connected discontinuous reception is configured and active.

2. The method of claim 1, wherein the first event further comprises a change of a wireless communication device connection state.

3. The method of claim 1, wherein the search is also resumed in response to a release of a radio resource control connection.

4. The method of claim 1, further comprising:
   determining if a connection has been requested;
   continuing the search when a connection has not been requested; and
   continuing the search when a connection has been requested but the wireless communication device is not in a connected state.

5. The method of claim 1, wherein initiating the search is based on at least one of an LTE idle state and an LTE connected state.

6. A wireless communication device for searching for one or more radio access technologies, comprising:
   a processor; and
   memory in communication with the processor, the memory having instructions that are executable by the processor to:

initiate a search for the one or more radio access technologies based on one or more Long Term Evolution (LTE) connection states;

determine if a mobility of the wireless communication device is lower than a predetermined threshold;

stop the search and presenting search results on a display if it is determined that the mobility the wireless communication device is not lower than the predetermined threshold;

suspend the search on a condition that a first event occurs, wherein the first event comprises a determination that the mobility of the wireless communication device is lower than the predetermined threshold;

store the search results in the memory; and resume the search, during connected discontinuous reception, in response to determining that the wireless communication device is in a connected radio resource control state and in response to determining that connected discontinuous reception is configured and active.

7. The wireless communication device of claim 6, wherein the first event further comprises a change of a wireless communication device connection state.

8. The wireless communication device of claim 6, wherein the search is also resumed in response to a release of a radio resource control connection.

9. The wireless communication device of claim 6, further comprising:

instructions that are executable by the processor to determine if a connection has been requested, wherein the search continues when a connection has not been requested.

10. A non-transitory computer-readable medium for searching for one or more radio access technologies, the non-transitory computer-readable medium having instructions thereon, the instructions comprising:

code for causing a wireless communication device to initiate a search for the one or more radio access technologies based on one or more Long Term Evolution (LTE) connection states;

code for causing the wireless communication device to determine if a mobility of the wireless communication device is lower than a predetermined threshold;

code for causing the wireless communication device stop the search and presenting search results on a display if it is determined that the mobility of the wireless communication device is not lower than the predetermined threshold;

code for causing the wireless communication device to suspend the search on a condition that a first event occurs, wherein the first event comprises a determination that the mobility of the wireless communication device is lower than the predetermined threshold;

code for causing the wireless communication device to store the search results; and code for causing the wireless communication device to resume the search, during connected discontinuous reception, in response to determining that the wireless communication device is in a connected radio resource control state and in response to determining that connected discontinuous reception is configured and active.

11. The non-transitory computer-readable medium of claim 10, wherein the first event further comprises a change of a wireless communication device connection state.

12. The non-transitory computer-readable medium of claim 10, wherein the search is also resumed in response to a release of a radio resource control connection.

13. The non-transitory computer-readable medium of claim 10, wherein the instructions further comprise:

code for causing the wireless communication device to determine if a connection has been requested; and code for causing the wireless communication device to continue the search when a connection has not been requested.

14. An apparatus for searching for one or more radio access technologies, comprising:

means for initiating a search for the one or more radio access technologies based on one or more Long Term Evolution (LTE) connection states;

means for determining if a mobility of the apparatus is lower than a predetermined threshold;

means for stopping the search and presenting search results on a display if it is determined that the mobility of the apparatus is not lower than the predetermined threshold;

means for suspending the search on a condition that a first event occurs, wherein the first event comprises a determination that the mobility of the apparatus is lower than the predetermined threshold;

means for storing the search results; and means for resuming the search, during connected discontinuous reception, in response to determining that the apparatus is in a connected radio resource control state and in response to determining that connected discontinuous reception is configured and active.

15. The apparatus of claim 14, wherein the first event further comprises a change of an apparatus connection state.

16. The apparatus of claim 14, wherein the search is also resumed in response to a release of a radio resource control connection.

17. The apparatus of claim 14, further comprising:

means for determining if a connection has been requested; and means for continuing the search when a connection has not been requested.

* * * * *